UNITED STATES PATENT OFFICE.

HENRY W. WANAMAKER, OF BALTIMORE, MARYLAND.

PAVING BRICK OR BLOCK.

SPECIFICATION forming part of Letters Patent No. 666,078, dated January 15, 1901.

Application filed September 26, 1900. Serial No. 31,158. (No specimens.)

*To all whom it may concern:*

Be it known that I, HENRY W. WANAMAKER, a citizen of the United States, residing at Baltimore, in the State of Maryland, have invented new and useful Improvements in Paving Bricks or Blocks, of which the following is a specification.

My invention relates to a composition of matter which is especially adapted to the manufacture of paving blocks or bricks; and the object is to provide a hard, tenacious, and non-absorbent brick or block for paving purposes, as for road-beds or where a very hard and durable brick or block is required, which in its make-up will be hard and tenacious enough not to crack, break, or crumble under the wear and tear of travel, which will resist the crushing effect of heavy weights, and also which being non-absorbent will not be injuriously affected by the weather.

In the carrying out of my invention I use a clay which is rich in iron, which clay forms the main ingredient of the composition. Such clay by itself is not suitable for the manufacture of paving-bricks, for the reason that it will not vitrify when subjected to the usual heat in a kiln, and in order to secure vitrification I thoroughly mix with the clay a less quantity of clay-slate which is finely ground or pulverized. The clay and clay-slate are properly ground together and mixed with the addition of water in the usual way and to the proper degree of plasticity and are then molded into bricks or blocks of the desired shape and size. The bricks or blocks are dried in the usual way and are baked or fired in a kiln until they are perfectly vitrified throughout.

As to the proportions of the ingredients I may use seventy per cent. of the clay and thirty per cent of clay-slate which is finely ground or pulverized. These proportions may be varied; but in every instance there is an excess of clay over the clay-slate.

The clay-slate is used as a flux, and by the use of the same the clay vitrifies thoroughly at a lower heat than is usually employed in the manufacture of vitrified brick and produces a first-class brick or paving-block and enables me to employ the clay hereinbefore mentioned as a base.

An analysis of the natural product which I have designated as "clay" contains: silica, 59.73 per cent.; alumina, 24.53 per cent.; lime, 0.87 per cent.; magnesia, 0.32 per cent.; iron oxid, 8.74 per cent.; moisture and undetermined ingredients, 5.81 per cent.

An analysis of the slate-clay gives the following: silica, 57.45 per cent.; alumina, 31.77 per cent.; lime, 1.26 per cent.; magnesia, 1.52 per cent.; iron oxid, 5.71 per cent.; moisture and undetermined ingredients, 2.29 per cent.

By mixing the above-mentioned natural clays in the proportion of seventy per cent. of the red clay to thirty per cent. of the dark and fissile or slate-clay after the latter is finely ground I produce a mixture from which a superior paving brick or block can be made by treatment in the usual manner.

I am aware that prior to my invention aluminous clay and slate have been incorporated, molded, and burned to make a brick; but in such composition the proportions are such that there is an excess of slate over the clay, whereas in the composition which I employ the proportions are reversed and the slate is used as a flux, so that the clay will vitrify at a lower heat and produce a satisfactory and commercial paving-block.

What I claim as my invention, and desire to secure by Letters Patent, is—

A composition for use in the manufacture of paving bricks or blocks made up by incorporating two natural clays together the resulting mixture containing silica 59.046 per cent., alumina 26.702 per cent., lime .987 per cent., magnesia .68 per cent., iron oxid 7.831 per cent., substantially as set forth.

In testimony whereof I have hereunto set my hand in presence of two subscribing witnesses.

HENRY W. WANAMAKER.

Witnesses:
 THOS. KELL BRADFORD,
 W. ESTEER.